Aug. 27, 1968         L. K. DAVIS         3,399,317
MOTION DAMPER
Filed April 24, 1964

INVENTOR.
LOUIS K. DAVIS
BY Henry W. Kaufmann
AGENT

United States Patent Office 3,399,317
Patented Aug. 27, 1968

3,399,317
MOTION DAMPER
Louis K. Davis, Phoenixville, Pa., assignor to General
Electric Company, a corporation of New York
Filed Apr. 24, 1964, Ser. No. 362,216
5 Claims. (Cl. 310—93)

ABSTRACT OF THE DISCLOSURE

Inside a spherical enclosure of diamagnetic material there is provided a spherical member free to rotate, and containing an array of permanent magnets whose fields repel the diamagnetic material, tending to keep the member centered in the housing, and combine to produce a net magnetic field external to the enclosure to interact with an external ambient magnetic field. Damping means are provided to damp relative motion of the member with respect to the enclosure.

---

Figure 1:
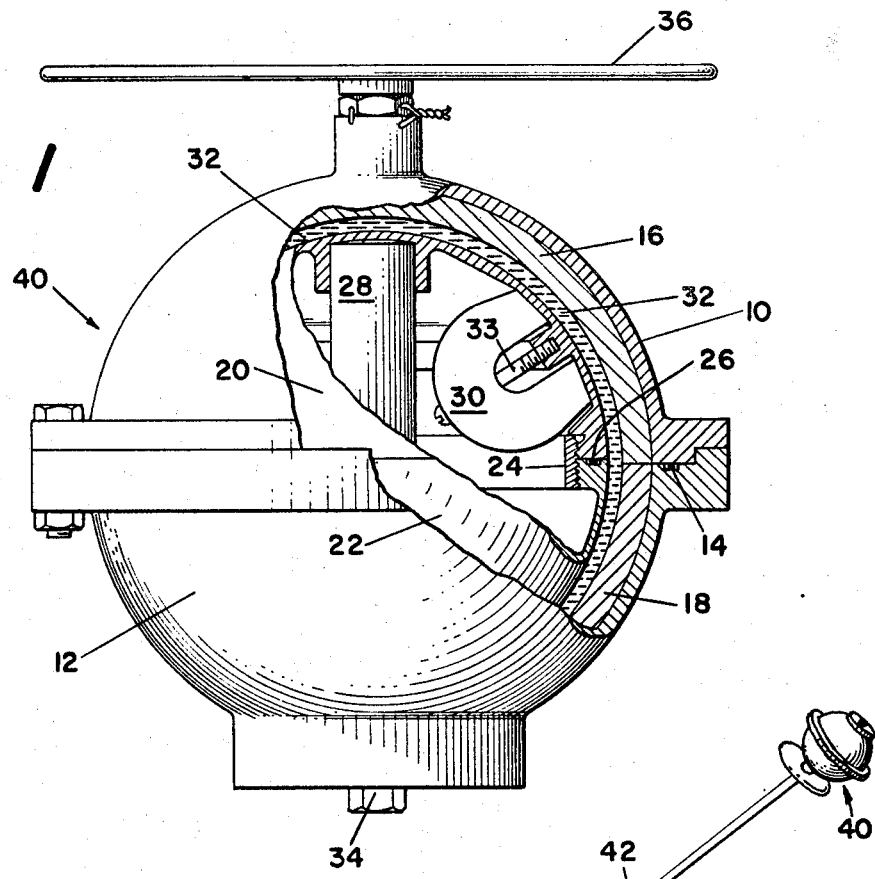

This invention pertains to the art of damping motion or oscillation, and particularly to devices in which a viscous fluid is employed to dissipate the energy of such motion or oscillation.

In the prior art, it is well known to damp oscillations by the use of an inertial damping system consisting of an energy-dissipating coupling between the oscillating member and a suitably large mass. The common torsional vibration damper employed on the crankshafts of automobile engines is an example of this. However, it is essential for the effective functioning of inertial damping systems that the mass be sufficiently large so that its inertia loads the energy-dissipating coupling adequately; that is, the energy flow through the coupling to the mass or reaction means, as it is driven by the oscillations to be damped, must be great enough to dissipate energy at the rate required for the desired damping. Where the oscillations to be damped are between two parts which, except for the oscillations, remain in fixed position relative to one another, the energy-dissipating coupling may simply be connected between the parts. This may be called a rigid damping system. The ordinary automobile shock absorber is perhaps the most common example of this latter system; it does not require the addition of a separate mass to load the shock absorber, because the shock absorber is rigidly connected between the two parts whose relative motion is to be damped. While it is true that the wheels are connected through the compliant tires to the very large mass of the earth, even if the car were suspended in air by a cable, the rigidly connected shock absorbers would still damp oscillations between the car proper and the unsprung running gear.

In most applications of dampers employing inertial loading, that is, a large mass, the oscillations to be damped occur substantially in only one or two degrees of freedom; the automobile crankshaft damper, for example, has to damp only torsional vibrations around the axis of the crankshaft. For such applications, the problem of suspending the required mass is usually not so great that provision of adequate mass is difficult. When it is required to damp, for example, oscillations in three degrees of rotational freedom, the problem of mounting a sufficient mass may become burdensome.

I have invented a device for damping oscillations in three degrees of rotational freedom in which the required mass is much reduced, compared with that required by the prior art. I achieve this by modifying the conventional inertial damper into an analogue of the rigid damping system in which the energy-dissipating coupling is connected between the two relatively moving parts. I accomplish this by creating magnetic coupling forces between the inertial mass and the reference body with respect to which the oscillations of the moving body are to be damped. In a particular embodiment of my invention which is to be preferred for many purposes, I provide a moving mass which is substantially spherical in shape and includes a bar magnet, to provide a large external field to interact with a magnetic field from the reference body. Such a sphere is immersed in a viscous fluid which is itself in an external housing, preferably spherical. This external housing is mechanically connected to the member whose oscillations are to be damped. When the housing oscillates with the member to which it is connected, the viscous fluid couples this motion to the internal sphere. This sphere, through its inertia, produces a viscous drag on the housing by coupling through the viscous fluid; but this drag is increased because the sphere is restrained not only by its inertia but also by the magnetic forces acting on it from the reference body.

Thus, a general object of my invention is to increase the effectiveness of an inertial damping system by magnetically coupling the inertial mass of such a system to a reference body. As will appear in the subsequent description, achieving this object leads me to the achievement of other desirable objects, such as production of an efficacious damping system of reduced mass, capable of being hermetically sealed, and thus reliable, inexpensive and simple. In particular, it will be described how this invention is particularly suited to use in free fall conditions to stabilize an artificial satellite with respect to a parent body which is a source of magnetic field; and thus it achieves the desirable objectives implicit in such use.

In a copending application made jointly by me and Sanford M. Weinberger, entitled "Diamagnetic Bearing," Ser. 362,307, filed Apr. 24, 1964, and assigned to the assignee of this application, it is disclosed how permanent magnets and diamagnetic materials may be utilized to provide a bearing which is free from an initial "breakaway" or frictional torque. In the preferred embodiment of the present invention, I employ this teaching to maintain the moving mass centrally located within the housing. However, while the diamagnetic bearing is ordinarily incapable of operation under normal gravitational fields at the earth's surface, my present invention permits the use of auxiliary flotation forces to support most of the weight of the moving mass, leaving only such a differential force as may be provided by the diamagnetic bearing, thus permitting the convenient use of the present invention in normal gravitational fields.

For the better understanding of my invention, I have provided figures of drawing, in which—

Figure 2:
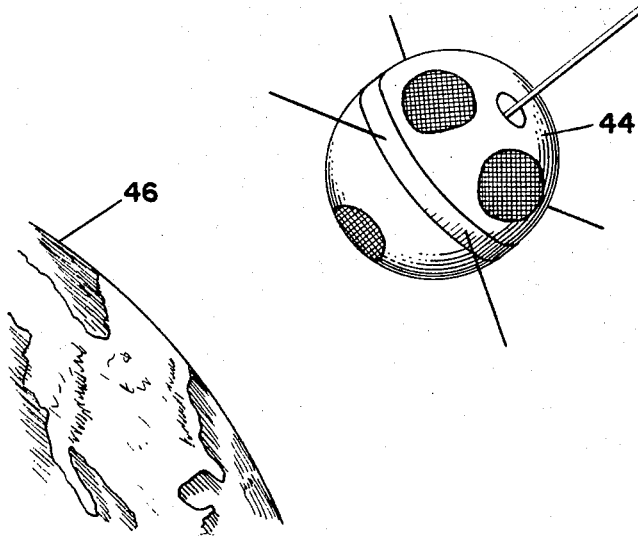

FIG. 1 represents partly in section or cutaway the preferred embodiment of my invention, and FIG. 2 represents the application of my invention to a satellite moving in space.

The housing of the embodiment represented in FIG. 1 is formed of two non-magnetic roughly hemispherical cast shells 10 and 12, which may be fastened together by bolts through their mating flanges, a gasket or O-ring 14 being employed in a groove in the flange of 12 to form a hermetic seal. Within the castings 10 and 12 are two hemispherical bismuth pieces 16 and 18, each 0.27 inch thick, and having an inner diameter of 4.20 inches. Their faces mate when castings 10 and 12 are joined, to form a substantially perfect bismuth phere. Within the bismuth sphere thus formed there lies an inner sphere of outside diameter 4.00 inches formed ow two hemispherical shells 20 and 22 of nonmagnetic material, which are joined by internal threads at their edges which screw onto a male thread of an inner ring 24. A gasket or O-ring 26 in a groove in hemisphere 22 renders this joint also hermetically tight. A bar magnet 28 extends axially across the the inner sphere, from one pole of the sphere to the other, its ends not quite passing through shells 20 and 22, but lying just below the surfaces of those shells, as represented. Six horseshoe magnets 30 also lie within the inner sphere, with their poles lying just beneath the surface of the hemispherical shells 20 and 22. Three magnets 30 lie within the upper (as represented) shell 20, and three within the lower (as represented) shell 22. The center lines (i.e., the axis of symmetry passing through the center of the yoke of each magnet 30 and passing equidistantly between its poles) of the three magnets 30 lying within hemispherical shell 20 are 120 degrees apart in longitude; and the three magnets 30 lying within hemispherical shell 22 are respectively antipodal to these. The center lines of the three magnets 30 located in upper hemispherical shell 20 intersect it at 27 degrees upper latitude from the joint between shells 20 and 22; and the three magnets 30 located in lower hemispherical shell 22 are, as stated, antipodal to them. A viscous fluid 32 fills the space between the inner sphere formed of shells 20 and 22 and the bismuth sphere formed of hemispheres 16 and 18, being introduced through a fill hole which is then closed by fill plug 34. The viscous fluid employed in actual use of the described embodiment is a silicone oil having a viscosity of 100 centistokes, marketed by the General Electric Company under the commercial designation of SF96(100). For the use for which this embodiment was built, this oil has the advantage of having a relatively small variation of viscosity with temperature. To accommodate its expansion with temperature variation, a flexible expansion chamber or bellows was mounted on the upper casting 10, with its interior connected with the interior space of the device. Small holes (0.062 inch), too small to affect its magnetic properties appreciably, pierce the bismuth sphere to connect the internal space of the device with the fill hole and the bellows.

The following details are given for completeness; they are subject to modification to meet varying requirements. Bar magnet 28 is a circular bar of nominal diameter 0.75 inch, 3.896 inches long. Since it was mounted simply by resting in recesses in internal bosses in shell 20 (as represented) and in shell 22, its ends were ground to provide a sliding fit within the recesses, whose internal diameter was 0.748 inch. Magnets 30 are horseshoe magnets each provided with a hole passing through the yoke concentrically with the center line of the magnet to accommodate a machine screw 33 which fitted a hole tapped in a circular rib in the shell 20 or 22. The pole pieces of magnets 30 were chamfered slightly to make them fit the curved inner surface of the shell. All the magnets are of the material well known in the trade as Alnico V, whose composition is published in the reference book, "Engineering Alloys," by Woldman, American Society for Metals, 1954. The weight of magnet 28 is approximately 0.457 pound; that of each magnet 30 is approximately 0.120 pound.

As is described in more detail in the copending application "Diamagnetic Bearing" to which reference has already been made, a symmetrical structure of permanent magnets like that here comprised of magnets 30 and bar magnet 28, located in opposition to a symmetrical diamagnetic structure like the bismuth spherical composed of hemispheres 16 and 18, will tend, within the limits imposed by the forces available, to remain centrally located within the diamagnetic structure, free to rotate. Because of the symmetrical arrangement of the magnets 30 and the proximity of opposite magnetic poles produced by the horseshoe shape, an external ambient magnetic field will produce negligible net torque upon the array of magnets 30. However, with bar magnet 28 the case is different. The opposite poles of magnet 28 are as far apart as they can be for a given length of magnetic material; the permeability of the bismuth sphere is only very slightly less than unity and the other materials of the housing have a permeability which is practically unity. Consequently, the bar magnet 28 has an appreciable magnetic moment with which it can interact with ambient magnetic fields entering from outside the housing comprising 10, 12, 16 and 18. Thus the present embodiment discloses an inner sphere suspended with three degrees of rotational freedom in a viscous fluid which is also in contact with the external housing; and the inner sphere is capable of reacting with magnetic field external to the entire embodiment.

If the outer housing of the embodiment of FIG. 1 is rotated in any direction, the outer housing will, of course, rotate the bismuth hemispheres 16 and 18, and these latter will viscously drag the fluid 32 into rotation, which fluid will drag the inner sphere. In the absence of an external magnetic field, the inner sphere will be accelerated into rotation at a rate initially inversely proportional to the moment of inertia of the inner sphere. The lag between the rotation of the outer housing and of the inner sphere will produce a shear in the viscous fluid 32, with consequent dissipation of energy. Once the inner sphere has reached the same angular velocity as the outer housing, fluid shear and energy dissipation will stop, until the rotation of the housing is altered. If, however, an external magnetic field is applied, the bar magnet 28 will tend to align itself with the field; and, if the external field is sufficiently strong, the inner sphere will not rotate, but will be held fixed by the magnetic forces on bar magnet 28, so that viscous shear and energy dissipation will continue as long as the outer housing is rotated. Thus the addition of the bar magnet and the application of the external field produces an effect such as would be produced by an infinite mass in a dynamic damping system, or by a rigid damping system.

Since the torque produced by the viscous fluid upon the inner sphere is a monotone increasing function of angular velocity of the outer housing, for low angular velocities even weak external ambient magnetic fields will suffice to prevent rotation of the inner sphere under the weak torques produced by the slowly moving viscous fluid.

FIG. 2 represents an application of my invention under conditions in which angular velocities will, during normal operation, be extremely small. The damper 40 disclosed in FIG. 1 is represented attached by a long extensible rod 42 to a satellite 44, which is in orbit above earth 46. In accordance with well known principles, the gradient of gravity causes the rod 42 to point toward the earth's center of gravity as the satellite moves in orbit; but this means of orientation is subject to oscillations if the system is disturbed from its equilibrium position. The damper 40 is subject to the earth's magnetic field, which will tend to align the bar magnet 28 with itself. Any oscillations of the system damper-rod-satellite with respect to the earth will produce rotational oscillations of the damper 40. Because of the stabilizing torque produced by the gravity gradient is very small, the period of such oscillations will be long, and the resulting velocity of rotation will be very small. The velocity being so small, the torques applied to damper 40 will be sufficiently small that the earth's magnetic field will suffice to lock the inner sphere of damper 40, producing maximum damping despite the comparatively small mass of the inner sphere.

While the application represented in FIG. 2 is one under conditions of free fall, the present invention is not limited to this condition of operation. As is evident from FIG. 1, the magnets 28 and 30 occupy only a small part of the volume inclosed by hemispherical shells 20 and 22. Consequently, it is simple to ballast the inner space, symmetrically so that the inner sphere will be balanced around its geometrical center, to render the average density of the inner sphere approximately the same as that of the viscous fluid 32. Under such conditions, even in a gravity field, the residual buoyancy or heaviness of the sphere will be within the capabilities of the diamagnetic suspension to overcome, so that the inner sphere will remain centered. Under these conditions, the damper may be used in one-g fields, or under comparable accelerations.

What is claimed is:
1. An external diamagnetic envelope surrounding an internal magnetic structure free to rotate within the said envelope, providing magnetic fields tending to center the said internal structure within the said envelope and having a net magnetic field external to the said envelope;
and a viscous fluid filling the space between the said envelope and the said internal magnetic structure.

2. An external substantially complete shell of bismuth metal having a substantially spherical internal cavity;
a nonmagnetic housing external to and supporting the said sphere, adapted to be hermetically sealed;
a substantially spherical internal structure of radius less than the radius of the said substantially spherical cavity, comprising
    a nonmagnetic supporting structure supporting
        a plurality of horseshoe magnets symmetrically located with respect to the spherical center of the said substantially spherical internal structure, with their pole faces facing the outside surface of the said internal structure, and
        a bar magnet with its magnetic poles located at opposite geometric poles of the said substantially spherical internal structure;
    a viscous fluid filling the space between the said shell of bismuth metal and the said substantially spherical internal structure.

3. A device as claimed in claim 2 in which the average density of the said substantially spherical internal structure is approximately equal to the density of the said viscous fluid.

4. A split nonmagnetic housing comprising two mating parts fastened together to form a hermetically sealed joint;
two hemispherical shells of metallic bismuth fitting the respective interiors of the two said mating parts of the said split housing and having mating surfaces which mate to form a spherical shell of bismuth when the two said mating parts are fastened together;
a split nonmagnetic spherical housing of radius less than the internal radius of the said spherical shell of bismuth, located within the said spherical shell, containing in its interior
    a bar magnet extending between opposite geometric poles of the said split nonmagnetic spherical housing;
    a plurality of horseshoe mangets with their poles located substantially at the surface of the said spherical housing;
a filling passage extending from the exterior of the said split housing into the space between the said spherical shell of bismuth and the said nonmagnetic spherical housing;
means for closing the said filling passage;
a viscous fluid filling the space between the said spherical shell of bismuth and the said nonmagnetic spherical housing.

5. A mechanical damping system comprising:
an external housing comprising diamagnetic means;
an internal part within the said housing free to move therein, provided with permanent magnetic means to produce repulsion from said diamagnetic means and to provide a net external magnetic field to interact with an external ambient magnetic field;
damping means to provide damping of relative motion between the said housing and the said internal part.

References Cited
UNITED STATES PATENTS
2,622,707   12/1952   Faus _____ 310—93 X
3,114,518   12/1963   Fischell _____ 310—93 X MILTON O. HIRSHFIELD, *Primary Examiner.*

D. X. SLINEY, *Assistant Examiner.*